United States Patent Office 3,313,743
Patented Apr. 11, 1967

3,313,743
EPOXIDE POLYMERIZATION IN THE PRESENCE OF A CARBONIUM ION PRECURSOR AS A MOLECULAR WEIGHT CONTROL AGENT
Leo J. Filar, Newark, and Edwin J. Vandenberg, Wilmington, Del., assignors to Hercules Incorporated, a corporation of Delaware
No Drawing. Filed Nov. 27, 1964, Ser. No. 414,393
11 Claims. (Cl. 260—2)

This application is a continuation-in-part of our application U.S. Ser. No. 334,914, filed Dec. 31, 1963, and now abandoned.

This invention relates to a process of controlling the molecular weight of the polymer produced in the polymerization of epoxides (oxiranes) wherein a chelated organoaluminum-water reaction product is used as the catalyst.

It is now well known that organoaluminum compounds that have been reacted with water and/or a chelating agent within a limited molar ratio, are excellent catalysts for the homo- and copolymerization of oxiranes. Because of the excellence of this polymerization reaction, the process frequently takes place with the production of very high molecular weight polymers which in some cases are too high for a particular use or for easy fabrication. Solution polymerizations are often desirable, but may yield a product of much higher viscosity than needed, which situation was avoided only by polymerization at lower, less economical solids levels. While some control in the molecular weight of the polymer produced can be achieved by polymerizing to a lower conversion, i.e., shortening the polymerization time, or by selecting a less active catalyst system for the monomer or monomers being polymerized, such practices are not generally economical and, furthermore, may not achieve the desired degree of lowering the molecular weight.

Now in accordance with this invention it has been found that the molecular weight of the polymer product can be readily controlled by carrying out the polymerization in the presence of a carbonium ion precursor. Surprisingly, these additives not only cause the production of a lower molecular weight polymer, but do so without materially affecting the yield of or conversion to polymer. Because of their effectiveness in reducing the molecular weight of the polymer product, it is possible to use the most active catalyst for a given polymerization reaction and obtain the high conversions of such systems but produce a polymer within the desired molecular weight range.

The mechanism by which these carbonium ion precursors effect the reduction in the molecular weight without seriously affecting the rate of polymerization or conversion is not known. It is believed that the carbonium ion precursor reacts with one or more of the reaction components, i.e., the catalyst and/or the epoxide being polymerized, or the growing polymer chains, to produce a carbonium ion which then enters into the polymerization reaction and may act as a chain transfer agent to yield a lower molecular weight polymer. At the same time, there is, of course, formed a counter-ion which may also enter into the molecular weight controlling behavior of said precursor. Thus, with acid anhydrides, as for example, acetic anhydride, or acid chlorides, as for example, acetyl chloride, an acylium ion is believed to be formed on reaction with the organoaluminum-water-chelate catalyst according to the reaction:

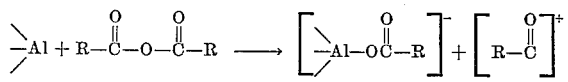

or

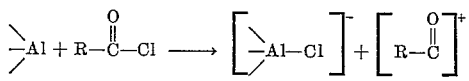

Other carbonium ion precursors that may react with the catalyst or the growing polymer chain to form a carbonium ion are organic halides, thioethers, acetals, phosgene, etc. Other carbonium ion precursors may react with the epoxide being polymerized to produce a carbonium ion, as for example, organoboron compounds, sulfonyl halides, phosphorus halides, etc. This reaction can be illustrated by the following reaction shown for a trialkylboron with an epoxide:

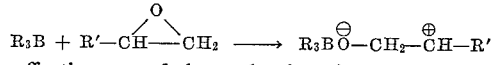

The effectiveness of the carbonium ion precursor in reducing the molecular weight depends in large part on the stability of the carbonium ion formed in the polymerization reaction mixture. Thus, some carbonium ions are more effective when the polymerization diluent is a non-polar solvent, whereas others may require a polar solvent in order to obtain a more solvated carbonium ion.

Regardless of what the theory may be by which the molecular weight reduction of the polymer is achieved, it has been discovered in accordance with this invention that the addition of a compound which on reaction with one or more of the components of the polymerization reaction mixture forms a carbonium ion is effective and such compounds can be designated as carbonium ion precursors. Exemplary of the compounds which are carbonium ion precursors are the carboxylic acid anhydrides, acid halides, such as carboxylic acid halides, sulfonic acid halides, phosgene, organic compounds which can yield a carbonium ion conjugated with a potential resonating system such as allylic halides, phenylated methyl halides, nitrates and sulfates, etc., acetals, thioethers, polysulfides, organoboron compounds, sulfuryl halides, phosphorus halides, etc. The carboxylic acid anhydride can be the anhydride of either a monocarboxylic acid or a polycarboxylic acid, including mixed anhydrides of either or both. Thus, the acid anhydride can be the anhydride of any aliphatic, cycloaliphatic or aromatic carboxylic acid or mixed anhydride thereof. Exemplary of the carboxylic acid anhydrides that can be used are the anhydrides of acetic acid, propionic acid, butyric acid, pentanoic acid, chloroacetic acid, benzoic acid, the toluic acids, cyclohexyl carboxylic acid, phthalic acid, isophthalic acid, terephthalic acid, maleic acid, succinic acid, adipic acid, etc. Any acid halide, including both carboxylic acid halides and sulfonic acid halides, can be used, as for example, aliphatic acid halides such as acetyl chloride, acetyl bromide, propionyl chloride, propionyl bromide, etc., aralkyl acid halides such as phenylacetyl chloride, and aryl acid halides such as benzoyl chloride and aliphatic, and aromatic sulfonic acid halides such as ethane sulfonyl chloride, toluene sulfonyl chloride, etc. Also effective are such compounds as phosgene, acetals such as 1,1-diethoxyethane, thioethers, including aliphatic, aromatic, aralkyl and mixed thioethers such as di-tert-butyl sulfide, p-methylbenzyl phenyl sulfide, etc., polysulfides such as dialkyl disulfides, diaryl disulfides and diaralkyl disulfides, as for example, di-n-butyl disulfide, di-t-butyl disulfide, p-methylbenzyl butyl disulfide, di-n-butyl tetrasulfide, polysulfides such as the condensation product of ethylene dichloride with sodium polysulfide, etc., and organo compounds which yield a carbonium compound conjugated with a potential resonating system such as allylic halides, as for example, allyl chloride, allyl bromide, crotyl chloride, crotyl bromide, phenylated methyl halides, nitrates and sulfates such as benzyl chloride, benzyl bromide, benzyl nitrate, benzyl sulfate, triphenylmethyl chloride, triphenylmethyl bromide, etc., or an $\alpha$-halo substituted ether such as bis(chloromethyl) ether, bis(bromomethyl) ether, etc. Exemplary of the organoboron compounds that can be used are the trialkyl borons (also called trialkyl borines and trialkyl boranes), alkyl boron halides, alkyl cycloalkyl borons, alkyl aryl borons, tricycloalkyl borons, triaryl borons, triaralkyl borons, etc., such as triethylboron, trimethylboron, triisobutylboron, tri-n-pentylboron, tri-n-octylboron, tricyclopentylboron, tricyclohexylboron, triphenylboron, tribenzylboron, butyl dimethyl boron, ethyl dicyclohexyl boron, diethyl phenyl boron, methyldibromoborane, ethyldichloroborane, propyldichloroborane, isobutyldichloroborane, etc. Of particular value are boron compounds having the general formula RR'R''B, where each of the R's is a hydrocarbon radical free of ethylenic unsaturation. Other carbonium ion precursors that can be used are the sulfuryl halides such as thionyl chloride, and phosphorus halides such as phosphoryl chloride, phosphorus trichloride, phosphorus pentachloride, and nitrosyl chloride.

These carbonium ion precursors are effective in controlling the molecular weight of the polymer produced by the polymerization of any oxirane with the catalyst formed by reacting an organoaluminum compound with water and/or a chelating agent. Exemplary of the organoaluminum compounds that may be chelated and/or reacted with water and used are trialkylaluminum compounds, tricycloalkylaluminum compounds, triarylaluminum compounds, dialkylaluminum hydrides, monoaluminumalkyl dihydrides, dialkylaluminum halides, monoalkylaluminum dihalides, dialkylaluminum alkoxides, monoalkylaluminum dialkoxides, and complexes of these compounds, as for example, the alkali metal aluminum tetraalkyls such as lithiumaluminum tetraalkyl, etc. Thus, these compounds may be defined as any aluminum compounds containing an aluminum to carbon bond or having the the formula AlRX$_2$ where R is any alkyl, cycloalkyl, aryl, or alkaryl radical and X may be alkyl, such as methyl, ethyl, propyl, isopropyl, n-butyl, isobutyl, amyl, hexyl, octyl, decyl, etc., aryl, such as phenyl, tolyl, halophenyl, etc., cycloalkyl, such as cyclohexyl, etc., hydrogen, halogen, such as chlorine, fluorine, or bromine, etc. Exemplary of such compounds are triethylaluminum, diethylaluminum hydride, diethylaluminum chloride, ethylaluminum dihydride, ethylaluminum dichloride, ethylaluminum dibromide, triisobutylaluminum, diisobutylaluminum hydride, tri-n-amylaluminum, trihexylaluminum, tridecylaluminum, triphenylaluminum, tricyclohexylaluminum, etc. In some cases it may be desirable to complex the organoaluminum compound with a complexing agent such as tetrahydrofuran, as for example, triisobutylaluminum complexed with a molar amount of tetrahydrofuran, etc.

The organoaluminum compound can be chelated and used or both chelated and reacted with water and used as the catalyst in accordance with this invention. Any alkylaluminum chelates and alkylaluminum enolates such as those formed by reacting a trialkylaluminum or dialkylaluminum hydride such as triethylaluminum, triisobutylaluminum, diisobutylaluminum hydride, etc., with an organic compound that is capable of forming a ring by coordination with its unshared electrons and the aluminum atom can be used. Preferably these chelating agents are characterized by two functional groups, one of which is an —OH group or —SH group, as for example, a hydroxyl, or an enol of a ketone, sulfoxide or sulfone, an OH of a carboxyl group, etc., which —OH or —SH group interacts with the trialkylaluminum or dialkylaluminum hydride to form a conventional, covalent aluminum-oxygen bond or aluminum-sulfur bond. The second functional group is one which contains an oxygen, nitrogen, or sulfur atom that forms a coordinate bond with the aluminum. The amount of chelating agent reacted with the alkylaluminum compound will generally be within the range of from about 0.01 to about 1.5 moles of chelating agent per mole of aluminum and preferably will be from about 0.1 to about 1 mole per mole of aluminum alkyl. Exemplary of the chelating agents that may be reacted with a trialkylaluminum or dialkylaluminum hydride and the chelate then reacted with water to produce the catalysts of this invention are diketones, such as acetylacetone, trifluoroacetylacetone, acetonylacetone, benzoylacetone, furoylacetone, thionyltrifluoroacetone, dibenzoyl methane, 3-methyl-2,4-pentane-dione, 3-benzyl-2,4-pentanedione, etc., ketoacids, such as acetoacetic acid, ketoesters such as ethyl acetoacetate, ketoaldehydes such as formylacetone, hydroxyketones such as hydroxyethyl methyl ketone, hydroxyacetone, o-hydroxyacetophenone, 2,5-dihydroxy-p-benzoquinone, etc., hydroxyaldehydes such as salicylaldehyde, hydroxy esters such as ethyl glycolate, 2-hydroxyethyl acetate, dicarboxylic acids and their esters such as oxalic acid, malonic acid, etc., monoesters of oxalic acid, mono- and diesters of malonic acid, etc., dialdehydes such as malonaldehyde, alkoxyacids such as ethoxyacetic acid, ketoximes such as 2,3-butane-dione-monoxime, dialdehyde monoximes such as glyoxal monoxime, hydroxamic acids such N-phenyl benzohydroxamic acid, dioximes such as dimethyl glyoxime, nitro compounds such as 1,3-nitroalcohols, 1,3-nitroketones, 2-nitroacetic acid, nitroso compounds such as 1,2-nitroso-oximes, etc. Chelating agents with two or more chelating functions may also be used, as for example, 2,5-dihydroxy-p-benzoquinone, bis(1,3-diketones) such as (CH$_3$CO)$_2$CHCH(COCH$_3$)$_2$,

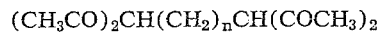
(CH$_3$CO)$_2$CH(CH$_2$)$_n$CH(COCH$_3$)$_2$ where $n$ is 2, 6 or 10, bis(1,2-ketoximes), bis(1,2-dioximes), etc.

Regardless of the organoaluminum compound that is used, it should be reacted with water as set forth above in a molar ratio of from about 0.1 mole of water per mole of organoaluminum compound up to about 1.5 moles of water per mole of aluminum compound. Slightly higher amounts of water may be used but at a ratio of about 2 moles of water to 1 mole of organoaluminum compound, there is little or no improvement over the use of no water in the polymerization system and when the ratio of water to organoaluminum compound gets appreciably above 2:1, it has an adverse effect and the polymerization is retarded or otherwise adversely affected. Preferably the molar ratio of water to organoaluminum compound will be in the range of from about 0.2:1 to about 1:1. The exact amount of water will depend to some extent on the organoaluminum compound, the epoxide or oxetane being polymerized, the diluent, temperature, etc.

Any desired procedure may be used for reacting the organoaluminum compound with the specified molar ratio of water. Generally, better results are obtained if the organoaluminum compound and water are prereacted and the reaction product then added to the polymerization mixture. This may readily be done, and preferably is done, by adding the specified amount of water gradually to a solution of the organoaluminum compound in an inert diluent, as for example, a hydrocarbon diluent such as n-hexane, toluene, or an ether such as diethyl ether or a mixture of such diluents. It may also be done in the absence of a diluent. If a chelating agent is used, it may be added before or after reacting with water.

Any amount of the organoaluminum-water reaction product may be used to catalyze the polymerization process in accordance with this invention from a minor catalytic amount up to a large excess but, in general, will be within the range of from about 0.2 to 10 mole percent based on the monomer being polymerized and preferably will be within the range of from about 1 to about 5 mole percent based on the monomer being polymerized. The amount used depends in part on such factors as monomer purity, diluent purity, etc.

The amount of the carbonium ion precursor added to control the molecular weight of the polymer produced will obviously depend on the degree of reduction in molecular weight desired. In general, the amount of additive used will be that amount that effects a reduction in molecular weight, and in general will be at least 0.01 mole and preferably at least about 0.1 mole of additive per mole of aluminum in the catalyst, the upper limit being set by the molecular weight desired. Generally, the upper limit will not exceed about 2 moles of additive per mole of aluminum in the catalyst, but in some cases as much as 10 to 50 moles can be used. In some cases, as with the less effective additives or when a very low molecular weight product is desired, the polymerization can be performed using liquid carbonium ion precursors as the diluent, in which case, as much as 200 moles of the precursor can be used per mole of aluminum.

The polymerization reaction may be carried out by any desired means, either as a batch or continuous process with the catalyst added all at one time or in increments during the polymerization or continuously throughout the polymerization. If desired, the monomer may be added gradually to the polymerization system. It may be carried out as a bulk polymerization process, in some cases at the boiling point of the monomer (reduced to a convenient level by adjusting the pressure) so as to remove the heat of reaction. However, for ease of operation, it is more generally carried out in the presence of an inert diluent. Any diluent that is inert under the polymerization reaction conditions may be used, as for example, ethers such as the dialkyl, aryl or cycloalkyl ethers, as for example, diethyl ether, dipropyl ether, diisopropyl ether, aromatic hydrocarbons such as benzene, toluene, etc., or saturated aliphatic hydrocarbons and cycloaliphatic hydrocarbons such as n-heptane, cyclohexane, etc., and halogenated hydrocarbons, as for example, chlorobenzene or haloalkanes such as methyl chloride, methylene chloride, chloroform, carbon tetrachloride, ethylene dichloride, etc. Obviously, any mixture of such diluents may be used and in many cases is preferable.

The molecular weight control additives, i.e., the carbonium ion precursor can be added to the polymerization process in any desirable manner. It can be added at the beginning all at once, in increments, or continuously throughout the polymerization. It some cases, it can be added to the catalyst solution prior to the polymerization reaction.

The polymerization process in accordance with this invention may be carried out over a wide temperature range and pressure. Usually, it will be carried out at a temperature from about —80° C. up to about 250° C., preferably from about —80° C. up to about 150° C., and more preferably within the range of about —30° C. to about 100° C. Usually, the polymerization process will be carried out at autogeneous pressure, but superatmospheric pressures up to several hundred pounds may be used if desired and in the same way, subatmospheric pressures may also be used.

As already pointed out, any epoxide (oxirane) or any mixtures thereof can be polymerized by the process of this invention to obtain the desired molecular weight polymer. Exemplary of the epoxides that can be so homo- or co-polymerized are the alkylene oxides such as ethylene oxide, propylene oxide, butene oxides, isobutylene epoxide, substituted alkylene oxides such as epichlorohydrin, epibromohydrin, methallyl chloride epoxide, trifluoromethyl ethylene oxide, perfluoropropylene oxide, perfluoroethylene oxide, vinyl chloride epoxide, dichloroisobutylene epoxide, 1,2-dichloro-3,4-epoxybutane, 1 - chloro - 3,4 - epoxybutane, 1-chloro-4,5-epoxypentane, 1,1-dichloro-2,3-epoxypropane, 1,1,1-trichloro - 2,3 - epoxypropane, 1,1,1 - trichloro - 3,4-epoxybutane, etc., cycloaliphatic epoxides such as cyclohexene oxides, vinyl cyclohexene oxides (mono- and dioxides), etc., epoxy ethers such as alkyl glycidyl ethers, as for example, methyl glycidyl ether, ethyl glycidyl ether, isopropyl glycidyl ether, isobutyl glycidyl ether, tert-butyl glycidyl ether, n-hexyl glycidyl ether, n-octyl glycidyl ether, etc., phenyl glycidyl ether, chlorophenyl glycidyl ethers, alkylphenyl glycidyl ethers, chloroalkyl glycidyl ethers such as chloroethyl glycidyl ether, bromoethyl glycidyl ether, 2-chloro-1-methyl ethyl glycidyl ether, unsaturated glycidyl ethers such as vinyl glycidyl ether, allyl glycidyl ether, allylphenyl glycidyl ether, crotylphenyl glycidyl ether, etc., glycidyl esters such as glycidyl acetate, glycidyl propionate, glycidyl pivalate, glycidyl methacrylate, glycidyl acrylate, etc., alkyl glycidates such as methyl glycidate, ethyl glycidate, etc., and other epoxides, as for example, styrene oxide, α-methylstyrene oxide, butadiene mono- and dioxides, epoxy stearates, 1-dimethylamino-2,3-epoxypropane, trimethyl 2,3-epoxypropyl ammonium chloride, etc.

The process of this invention is of particular importance in the preparation of elastomeric polymers obtained in the copolymerization of alkylene oxides with unsaturated epoxides where the most active catalysts, the trialkylaluminum-water-chelate catalysts, give polymers of molecular weights which are too high for satisfactory processing characteristics and also of too high viscosity to permit economic solids levels during polymerization. By the use of the molecular weight control additives in accordance with this invention, the molecular weight is readily reduced to a useful level without materially affecting catalyst activity.

The following examples exemplify the improved results that may be obtained on polymerizing epoxides and oxetanes in accordance with this invention. All parts and percentages are by weight unless otherwise indicated. The molecular weight of the polymers produced in these examples is shown by the Reduced Specific Viscosity (RSV) given for each. By the term "Reduced Specific Viscosity" is meant the $\eta_{sp.}/c$. determined on a solution of the polymer in a given diluent.

*Examples 1–7*

In each of these examples a polymerization vessel in which the air had been replaced with nitrogen was charged with 67 parts of n-heptane, 9.5 parts of 1,2-propylene oxide and 0.5 part of allyl glycidyl ether. After equilibrating at 50° C., the molecular weight control additive was added and then a solution of the catalyst was injected. The catalyst solution used was a 1 molar solution of triethylaluminum in n-heptane containing 3 moles of diethyl ether per aluminum and which had been reacted with 0.5 mole of water and 0.2 mole of acetylacetone per mole of aluminum. The amount of catalyst solution added in each case was equal to 0.2 part of triethylaluminum. Tabulated below is the molecular weight control additive used and the molar ratio thereof to the aluminum, along with the yield of polymer obtained after 19 hours at 50° C. and the RSV thereof as measured on a 0.1% solution in benzene at 25° C. The copolymer was isolated from the reaction mixture in each case by adding sufficient ether to make the solution of low viscosity for ease in handling, then washing the reaction mixture, first with a 3% aqueous solution of hydrogen chloride, then with water until neutral, then with a 2% aqueous solution of sodium bicarbonate, and again with water. After adding an amount of Santonox, i.e., 4,4'-thiobis(6- tert-butyl-m-cresol), in methanol equal to 0.5% based on the polymer, to the reaction mixture, the ether was evaporated and the polymer was dried.

TABLE I

| Example No. | Molecular Weight Control Additive | | Percent Conv. | RSV |
|---|---|---|---|---|
| | Added | Mole Ratio Additive to Al | | |
| 1 | None | | 97 | 10.8 |
| 2 | Acetic Anhydride | 0.5:1 | 100 | 10.6 |
| 3 | do | 1:1 | 84 | 5.7 |
| 4 | do | 2:1 | 100 | 6.3 |
| 5 | Phthalic Anhydride | 1:1 | 100 | 9.8 |
| 6 | Triethylboron | 0.1:1 | 95 | 7.8 |
| 7 | do | 1:1 | 97 | 5.0 |

The improved results obtained were obvious at the end of the polymerization run. Thus, in the control, Example 1, where no molecular weight control additive was used, the reaction mixture was a non-flowable mass, whereas in Examples 3 and 4, where a molecular weight control additive was used, the reaction mixture was a very viscous flowable mass. The improved results obtained are further exemplified by comparing the properties of the vulcanizates.

A control example was prepared by the general procedure described above, but without a molecular weight control additive, using a less efficient catalyst so as to obtain a product having an RSV of about 6. The catalyst used was triethylaluminum which had been reacted with 0.5 mole of water and 0.04 mole of acetylacetone and an amount equal to 0.3 part of triethylaluminum was used, the higher catalyst level needed to obtain a high conversion. This polymer and that obtained in Examples 4 and 7 were each vulcanized using the following formulation and curing for 30 minutes at 310° F:

| | Parts |
|---|---|
| Copolymer | 100 |
| High abrasion furnace black | 50 |
| Phenyl β-naphthylamine | 1 |
| Zinc oxide | 5 |
| Stearic acid | 2 |
| Benzothiazyldisulfide | 1 |
| Tetramethyl thiuramdisulfide | 2 |
| Sulfur | 2 |

Tabulated below are the physical properties measured on each of these vulcanizates:

| | Control | Example 4 | Example 7 |
|---|---|---|---|
| Modulus, p.s.i.: | | | |
| 100% | | 690 | 650 |
| 200% | | 1,600 | 1,460 |
| 300% | 1,400 | 2,140 | 2,100 |
| Tensile Strength, p.s.i. | 2,450 | 2,260 | 2,100 |
| Max. Elongation, percent | 560 | 320 | 240 |
| Hardness, Shore A | 68 | 73 | 70 |
| Break Set | 10 | 10 | 10 |

This data demonstrates that use of the molecular weight control additive in Examples 4 and 7 gave a copolymer which was much easier to cure, that is, had a much higher modulus at equal elongation, and at a lower catalyst level.

*Example 8*

Example 3 was duplicated except that the catalyst used was that obtained by reacting a 0.5 molar solution of triethylaluminum in n-heptane with 1.0 mole of acetylacetone per mole of aluminum and the polymerization was carried out at 80° C. The copolymer so produced was obtained in high yield and had an RSV of 7 (0.1% solution in benzene at 25° C.). A control run made without the addition of acetic anhydride as molecular weight control gave a high yield of copolymer having an RSV of 15 (0.1% solution in benzene at 25° C.).

*Examples 9–26*

In each of these examples, a polymerization vessel in which the air had been replaced with nitrogen was charged with the diluent, about 63 parts in the case of n-heptane and about 120 parts in the case of methylene chloride, and 5.0 parts of a 95:5 weight percent mixture of propylene oxide and allyl glycidyl ether and 2.0 mmoles of a carbonium ion precursor. After equilibrating at 50° C., an amount of a 0.5 M solution in 70:30 ether:heptane equal to 2 mmoles of the catalyst, based on aluminum, was added. The catalyst used was prepared by diluting a 25% solution of triethylaluminum in n-heptane with ether to 0.5 M concentration and then, while stirring at 0° C., adding over 15 minutes 0.5 mole of water per mole of aluminum. After stirring at 0° C. for 1 hour, 0.5 mole of acetylacetone per mole of aluminum was added and the mixture was stirred for 15 minutes at 0° C. and then for 20 hours at room temperature. The polymeriza-

TABLE II

| Example | Carbonium Ion Precursor | Heptane | | Methylene Chloride | |
|---|---|---|---|---|---|
| | | Percent Conv. | RSV | Percent Conv. | RSV |
| Control | None | 95 | 19.0 | 100 | 20.3 |
| 9 | Benzoic anhydride | 100 | 8.3 | | |
| 10 | Acetyl chloride | 99 | 5.7 | 75 | 8.5 |
| 11 | Acetyl bromide | 82 | 4.9 | 78 | 10.9 |
| 12 | Benzoyl chloride | 97 | 8.9 | 87 | 9.7 |
| 13 | p-Toluene sulfonyl chloride | | | 83 | 6.9 |
| 14 | Phosgene | 97 | 3.6 | 90 | 6.1 |
| 15 | Allyl chloride | | | 100 | 6.0 |
| 16 | Benzyl chloride | | | 100 | 10.0 |
| 17 | Trityl chloride | 98 | 4.2 | 79 | 7.6 |
| 18 | Bis(chloromethyl)ether | 97 | 8.3 | 100 | 8.8 |
| 19 | di-t-Butyl sulfide | 95 | 9.7 | | |
| 20 | p-Methylbenzyl phenyl sulfide | 68 | 11.9 | | |
| 21 | di-t-Butyl disulfide | 90 | 6.0 | | |
| 22 | Thionyl chloride | 23 | 2.9 | 11 | 1.4 |
| 23 | Phosphorus trichloride | 70 | 3.8 | 32 | 1.3 |
| 24 | Phosphorus pentachloride | 100 | 8.6 | 100 | 9.6 |
| 25 | Phosphorus oxychloride | 85 | 7.1 | 86 | 8.2 |
| 26 | 1,1-diethoxyethane | 100 | 7.5 | | | tion was carried out for 16 hours at 50° C., after which the reaction was terminated by adding 7 parts of anhydrous ethanol. The copolymer reaction mixture was stabilized by the addition of 1 part of an anhydrous ethanol solution containing 0.05 part of the condensation product of crotonaldehyde with about 3 moles of 3-methyl-6-tert-butylphenol and 0.025 part of lauryl 3-thio-dipropionate. The copolymer was isolated from the reaction mixture in each case by evaporation to dryness under vacuum for 24 hours at room temperature. In Table II is set forth the carbonium ion precursor added, along with the percent conversion to copolymer and the RSV of the copolymer as measured on a 0.1% solution in benzene at 25° C.

*Example 27*

A 95:5 mixture of propylene oxide and allyl glycidyl ether was copolymerized as described in Examples 9–26, using methylene chloride as the diluent with varying amounts of phosgene as the carbonium ion precursor. In Table III below is the molar ratio of phosgene to aluminum added, the percent conversion to copolymer and RSV of the copolymer as measured on a 0.1% solution in benzene at 25° C.

TABLE III

| Molar Ratio $COCl_2$ to Al | Percent Conv. | RSV |
| --- | --- | --- |
| Control | 100 | 16.7 |
| 0.25:1 | 94 | 9.6 |
| 0.5:1 | 92 | 7.9 |
| 0.75:1 | 90 | 8.0 |
| 1:1 | 90 | 6.9 |
| 1.5:1 | 94 | 2.7 |
| 2:1 | 86 | 3.1 |

*Example 28*

The procedure of Example 27 was repeated except that the diluent was n-heptane and the carbonium ion precursor was trityl chloride. In Table IV is set forth the molar ratio of trityl chloride to aluminum used, the percent conversion and RSV of the polymer.

TABLE IV

| Molar Ratio Trityl Cl to Al | Percent Conv. | RSV |
| --- | --- | --- |
| Control | 95 | 19.0 |
| 0.125:1 | 98.2 | 13.6 |
| 0.25:1 | 97.9 | 12.0 |
| 0.5:1 | 100 | 8.7 |
| 1:1 | 98.4 | 4.2 |
| 1.5:1 | 100 | 2.9 |
| 2:1 | 99 | 2.3 |

*Example 29*

Propylene oxide (5 parts) was polymerized following the procedure described in Examples 9–26, using methylene chloride as the diluent. The carbonium ion precursor added was phosgene in an amount equal to 50 moles per mole of aluminum. The poly(propylene oxide) was obtained in 100% conversion and was a viscous liquid which had an RSV of 0.10 (0.1% in benzene at 25° C.). A control run, without any phosgene, gave a 100% conversion to a tough rubber which had an RSV of 20 (0.1% in benzene at 25° C.).

*Example 30*

A 2-gallon stainless steel pressure reactor filled with nitrogen was charged with 2900 parts of anhydrous toluene, 100 parts of epichlorohydrin, 17 parts of n-heptane, 8.2 parts of allyl glycidyl ether and 6.4 parts of ethylene oxide. After heating to 130° C., there was added 5.1 ml. of a 1.5 M solution of triethylaluminum in hexane and 35 ml. of a 1 M solution of phosgene in toluene. Polymerization was started by feeding a 0.5 M solution of a triethylaluminum-0.5 water-0.5 acetylacetone catalyst (prepared as described in Examples 9–26, except that the triethylaluminum was initially dissolved in n-hexane) at a constant rate such that after 2 hours, 110 ml. had been added. At the same time as the catalyst feed was started, a 61% epichlorohydrin, 29% ethylene oxide, and 10% allyl glycidyl ether monomer mixture was pumped in at a rate such as to keep the initial monomer concentration constant, i.e., it was fed at the rate of polymerization. This monomer feed rate was based on gas chromatography analysis, using n-heptane as an internal standard, for the monomer concentrations and solids determinations for polymer concentration on periodic samples. There was fed a total of 118 parts of monomer mixture over 8 hours at 130° C. The reaction mixture was cooled to 90° C. and discharged with stirring into a solution of 1.6 parts of lauryl thiodipropionate and 0.8 part of the condensation product of crotonaldehyde with about 3 moles of 3-methyl-6-tert-butylphenol in 36 parts of anhydrous ethanol and 36 parts of toluene. The product was precipitated by adding 950 parts of commercial heptane, containing 2 parts of lauryl thiodipropionate and 0.1 part of the crotonaldehyde condensation product, to the vigorously stirred reaction mixture. After settling, the supernatant was decanted and the polymer was stirred twice more with 950 part aliquots of the heptane solution. It was then separated by filtration and dried under vacuum at room temperature to yield 80 parts of rubber. It was found on analysis to contain 62% epichlorohydrin, 30% ethylene oxide, and 8% allyl glycidyl ether and had a Mooney viscosity of 103 and an RSV of 3.2 (0.1% in α-chloronaphthalene containing 3% acetylacetone at 100° C.). A control run, made without the addition of phosgene, gave 90 parts of polymer with a Mooney viscosity of 130 and an RSV of 3.9 (0.1% in α-chloronaphthalene containing 3% acetylacetone at 100° C.).

*Example 31*

The procedure of Example 30 was repeated except that the monomers polymerized were epichlorohydrin and ethylene oxide and 5 times as much phosgene was added. The polymer product so produced, on analysis, was found to contain 68% epichlorohydrin and 32% ethylene oxide and it had a Mooney viscosity of 60. A control run, without the addition of any phosgene, gave a polymer having a Mooney viscosity of 140.

*Example 32*

Propylene oxide and allyl glycidyl ether were copolymerized as described in Examples 9–26, using methylene chloride as the diluent and 0.1 millimole of nitrosyl chloride as the carbonium ion precursor. The copolymer was obtained in a 100% conversion and had an RSV of 10, whereas the control, where no nitrosyl chloride was added, had an RSV of 20.3.

*Example 33*

Epichlorohydrin (10 parts) was polymerized by the procedure described in Examples 9–26, using methylene chloride as the diluent and trityl chloride as the carbonium ion precursor. The polyepichlorohydrin was obtained in a 100% conversion and had an RSV of 0.51 (as measured in a 0.1% solution in α-chloronaphthalene containing 3% acetylacetone at 100° C.), whereas the control, where no trityl chloride was added, had an RSV of 4.3.

*Examples 34–38*

These examples were carried out essentially as described in Examples 9–26, except that 10 parts of epichlorohydrin was polymerized instead of 5 parts of propylene oxide-allyl glycidyl ether mixture and toluene was used in place of the n-heptane and instead of isolating the polymer by evaporating the diluent as was done in those examples, the polymer was precipitated in each case by adding sufficient methylene chloride to obtain a handleable viscosity and then adding commercial heptane containing 0.3 g. per liter of the condensation product of crotonaldehyde and 3-methyl-6-tert-butylphenol. The precipitated polymer was collected, washed three times with the precipitant and then was dried for 16 hours under vacuum. In Table V is set forth the carbonium ion precursor added, along with the percent conversion and RSV, as measured on a 0.1% solution in $\alpha$-chloronaphthalene containing 3% acetylacetone at 100° C.

TABLE V

| Example | Carbonium Ion Precursor | Toluene | | Methylene Chloride | |
|---|---|---|---|---|---|
| | | Percent Conv. | RSV | Percent Conv. | RSV |
| Control | None | 42 | 10.1 | 39 | >6.5 |
| 34 | Acetyl chloride | 34 | 6.3 | | |
| 35 | Phosgene | 68 | 3.2 | | |
| 36 | Bis(chloromethyl) ether | | | 36 | 5.8 |
| 37 | 1,1-diethoxyethane | 38 | 4.8 | | |
| 38 | Phosphorus oxytrichloride | | | 41 | 3.9 |

What we claim and desire to protect by Letters Patent is:

1. In the polymerization of an oxirane with a catalyst selected from the group consisting of catalysts formed by reacting an organoaluminum compound containing at least one aluminum-to-carbon bond with a chelating agent and catalysts formed by reacting an organoaluminum compound containing at least one aluminum-to-carbon bond with water and a chelating agent, in a molar ratio of from about 0.1 to about 1.5, the step which comprises adding to the polymerization reaction as a molecular weight control agent a carbonium ion precursor in an amount such that the molar ratio of said agent to the organoaluminum compound is from about 0.01 to about 200, said carbonium ion precursor being selected from the group consisting of carboxylic acid anhydrides, carboxylic acid halides, sulfonic acid halides, phosgene, allylic halides, phenylated methyl halides, nitrates and sulfates, $\alpha$-halosubstituted ethers, acetals, thioethers, polysulfides, sulfuryl halides, phosphorus halides, nitrosyl halides, and organoboron compounds having the formula RR'R''B where each of the R's is a hydrocarbon radical free of ethylenic unsaturation.

2. The process of claim 1 wherein an oxirane alkylene oxide and an ethylenically unsaturated epoxide are copolymerized using acetic anhydride as the molecular weight control agent.

3. The process of claim 1 wherein an oxirane alkylene oxide and an ethylenically unsaturated epoxide are copolymerized using triethylboron as the molecular weight control agent.

4. The process of claim 1 wherein an oxirane alkylene oxide and an ethylenically unsaturated epoxide are copolymerized using phosgene as the molecular weight control agent.

5. The process of claim 1 wherein propylene oxide is polymerized using phosgene as the molecular weight control agent.

6. The process of claim 1 wherein epichlorohydrin is polymerized using trityl chloride as the molecular weight control agent.

7. The process of claim 1 wherein epichlorohydrin and ethylene oxide are copolymerized using phosgene as the molecular weight control agent.

8. The process of claim 2 wherein propylene oxide and allyl glycidyl ether are copolymerized.

9. The process of claim 3 wherein propylene oxide and allyl glycidyl ether are copolymerized.

10. The process of claim 4 wherein propylene oxide and allyl glycidyl ether are copolymerized.

11. The process of claim 1 wherein the molar ratio of the molecular weight control agent to the organoaluminum compound is within the ratio of from about 0.01 to about 50.

References Cited by the Examiner

UNITED STATES PATENTS 3,135,705  6/1964  Vandenberg _____ 260—2

FOREIGN PATENTS 796,863  6/1958  Great Britain.
1,045,662  12/1958  Germany.

OTHER REFERENCES

Furukawa et al., Pure and Applied Chemistry, vol. 4, Nos. 2–4, pp. 387–390 (1962).

Noller, Chemistry of Organic Compounds, 2nd ed., Saunders, 1957, Philadelphia, pp. 41 and 42 relied on.

WILLIAM H. SHORT, *Primary Examiner.*

SAMUEL H. BLECH, *Examiner.*

T. E. PERTILLA, S. N. RICE, *Assistant Examiners.*